(12) United States Patent
Iranpour (10) Patent No.: US 10,637,641 B2
(45) Date of Patent: Apr. 28, 2020

(54) ELECTROMAGNETIC WAVE PULSE SYNCHRONIZATION

(71) Applicant: WESTERNGECO LLC, Houston, TX (US)

(72) Inventor: Kambiz Iranpour, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 15/757,368

(22) PCT Filed: Aug. 31, 2016

(86) PCT No.: PCT/US2016/049795
§ 371 (c)(1),
(2) Date: Mar. 4, 2018

(87) PCT Pub. No.: WO2017/040727
PCT Pub. Date: Mar. 9, 2017

(65) Prior Publication Data
US 2018/0254884 A1    Sep. 6, 2018

Related U.S. Application Data

(60) Provisional application No. 62/214,965, filed on Sep. 5, 2015.

(51) Int. Cl.
*H04L 7/04* (2006.01)
*H04L 27/26* (2006.01)
(Continued)

(52) U.S. Cl.
CPC ............ *H04L 7/04* (2013.01); *G01S 7/003* (2013.01); *G01S 13/87* (2013.01); *G01S 15/87* (2013.01);
(Continued)

(58) Field of Classification Search
CPC . H04L 7/04; H04L 7/0029; H04L 7/08; H04L 7/0075; H04J 3/0638
(Continued)

(56) References Cited

U.S. PATENT DOCUMENTS 4,686,474 A * 8/1987 Olsen ............... G01V 3/165
324/331
6,049,882 A    4/2000 Paver
(Continued)

FOREIGN PATENT DOCUMENTS

EP    0158495 A2    10/1985
EP    2214034 A1    4/2010
(Continued)

OTHER PUBLICATIONS

Examination Report issued by the GCC Patent Office dated Feb. 24, 2019 in corresponding GC application No. GC 2016-31988; 4 pages.
(Continued)

*Primary Examiner* — Fitwi Y Hailegiorgis
(74) *Attorney, Agent, or Firm* — Fletcher Yoder, P.C.

(57) ABSTRACT

In some examples, a sensor node comprises a sensor to measure survey data of a target structure. The sensor node receives a wireless synchronization signal, and synchronizes an operation of the sensor node based on the wireless synchronization signal.

17 Claims, 5 Drawing Sheets

(51) Int. Cl.
*G01S 13/87* (2006.01)
*G01S 7/00* (2006.01)
*G01S 15/87* (2006.01)
*H04L 7/08* (2006.01)
*G01V 1/00* (2006.01)
*H04W 56/00* (2009.01)
*H04J 3/06* (2006.01)
*G01V 3/12* (2006.01)
*H04L 7/00* (2006.01)
*G01V 1/16* (2006.01)

(52) U.S. Cl.
CPC .............. *G01V 1/003* (2013.01); *G01V 3/12* (2013.01); *H04J 3/0638* (2013.01); *H04L 7/0029* (2013.01); *H04L 7/08* (2013.01); *H04L 27/26* (2013.01); *H04W 56/00* (2013.01); *G01V 1/164* (2013.01); *G01V 2200/12* (2013.01); *H04L 7/0075* (2013.01)

(58) Field of Classification Search
USPC ............................................ 375/355; 367/24
See application file for complete search history.

(56) References Cited

U.S. PATENT DOCUMENTS

| | | |
|---|---|---|
| 8,568,320 B2 | 10/2013 | Leskiw et al. |
| 2006/0004519 A1 | 1/2006 | Humphrey et al. |
| 2011/0141850 A1 | 6/2011 | Scott et al. |
| 2011/0251813 A1 | 10/2011 | Coman et al. |
| 2012/0082001 A1* | 4/2012 | Welker ................. G01V 1/3808 367/24 |
| 2015/0035537 A1 | 2/2015 | Juhasz et al. |
| 2015/0188695 A1 | 7/2015 | Crowell |

FOREIGN PATENT DOCUMENTS

| | | |
|---|---|---|
| WO | 2014027892 A1 | 2/2014 |
| WO | 2015/085155 A1 | 6/2015 |

OTHER PUBLICATIONS

Extended European search report issued by the European Patent Office dated Apr. 26, 2019 in corresponding EP application No. 16842952.0; 9 pages.
Radio clock retrieved at http://en.wikipedia.org/wiki/Radio_clock on Feb. 28, 2018.
International Search Report and Written Opinion for the equivalent International patent application PCT/US2016/049795 dated Dec. 14, 2016.
International Preliminary Report on Patentability for the equivalent International patent application PCT/US2016/049795 dated Mar. 15, 2018.
Examination Report issued by the GCC Patent Office dated Jul. 30, 2019 in corresponding GC application No. GC 2016-31988; 3 pages.
Office Action (Article94(3) EPC) issued by the European Patent Office dated Jan. 2, 2020 in corresponding EP application No. 16842952.0 (6 pages).

* cited by examiner

ELECTROMAGNETIC WAVE PULSE SYNCHRONIZATION

CROSS REFERENCE TO RELATED APPLICATION

This application claims the benefit under 35 U.S.C. § 119(e) of U.S. Provisional Application No. 62/214,965, entitled "ELECTROMAGNETIC WAVE PULSE SYNCHRONIZATION," filed Sep. 5, 2015, which is hereby incorporated by reference.

BACKGROUND

A survey data acquisition system can be used to acquire survey data of a target structure, such as a subterranean structure underneath an earth surface. The survey data acquisition system can include one or more survey sources and survey receivers. The one or more survey sources can generate survey signals that are directed into the target structure. Signals that are reflected from or otherwise affected by the target structure can be detected by the survey receivers, which can output measured survey data. The measured survey data can be transmitted to a remote computer system for recording and analysis. The remote computer system can then process the measured survey data to characterize the target structure, such as by producing an image of the target structure, producing a model of the target structure, or producing other data that provides a representation of one or more parameters relating to the target structure.

BRIEF DESCRIPTION OF THE DRAWINGS

Some implementations of the present disclosure are described with respect to the following figures.

DETAILED DESCRIPTION

Reference will now be made in detail to some implementations, examples of which are illustrated in the accompanying drawings and figures. In the following description, numerous specific details are set forth in order to provide a thorough understanding of some example implementations. However, it will be apparent to one of ordinary skill in the art that the implementations may be practiced without these specific details.

It will also be understood that, the terms first, second, etc., used to distinguish one element from another, and does not specify any order of elements or tasks. As used in the description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, operations, elements, and/or components, but do not preclude the presence or addition of one or more other features, integers, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

A survey data acquisition system can be a seismic data acquisition system, which includes a seismic source (or multiple seismic sources) and a seismic sensor node (or multiple seismic sensor nodes). In other examples, the survey data acquisition system can include an electromagnetic (EM) data acquisition system, which includes an EM source (or multiple EM sources), and an EM sensor node (or multiple EM sensor nodes).

More generally, a survey data acquisition system can include a survey source (or multiple survey sources) and a sensor node (or multiple sensor nodes), where a sensor node can include one or more respective sensors to acquire survey data of a target structure. In some examples, the target structure can include a subterranean structure that is underneath an earth or ground surface. In such examples, a survey data acquisition system can include a land-based acquisition system, a well-based acquisition system, or a marine acquisition system. In a land-based acquisition system, sensor nodes can be placed on land, such as at the earth surface. In a well-based acquisition system, sensor nodes can be carried on a tool into a wellbore. In a marine acquisition system, the sensor nodes are towed through a body of water or placed on a sea floor or the floor of another body of water.

Although reference is made to surveying subterranean structures in the disclosure, it is contemplated that techniques or mechanisms according to some implementations can be applied to survey other types of target structures, such as human tissue, mechanical structures, plant tissue, animal tissue, solid volumes, substantially solid volumes, volumes of liquid, volumes of gas, volumes of plasma, and volumes of space near and/or outside the atmosphere of a planet, asteroid, comet, moon, or other body, and so forth A sensor node can include one or more sensors to measure survey data. In addition, the sensor node can include electronic components to digitize and record survey data acquired by the sensor(s). The electronic components of a sensor node can operate using a clock signal produced by an internal clock of the sensor node. A clock signal can refer to a signal that oscillates between different amplitudes at a specified frequency. A clock is a device that can produce the clock signal. In some examples, the clock can include an oscillator.

In a survey data acquisition system that includes multiple sensor nodes, the frequency of the clock signal that is used in each sensor node can drift over time relative to a target frequency. As a result, operations performed by the sensor node, including sampling of survey data at time intervals based on the clock signal in the sensor node, may no longer by synchronized with respect to a master or global clock signal, such as the clock signal of a communications medium used to communicate data between sensor nodes and a remote destination device (e.g., a remote computer system).

In accordance with some implementations of the present disclosure, techniques or mechanisms are provided to synchronize operations of sensor nodes in a survey data acquisition system based on use of a wireless synchronization signal that is transmitted by a transmitter (or multiple wireless synchronization signals transmitted by one or more transmitters) to the sensor nodes. The wireless synchronization signal can include a light signal or an EM signal.

Figure 1:
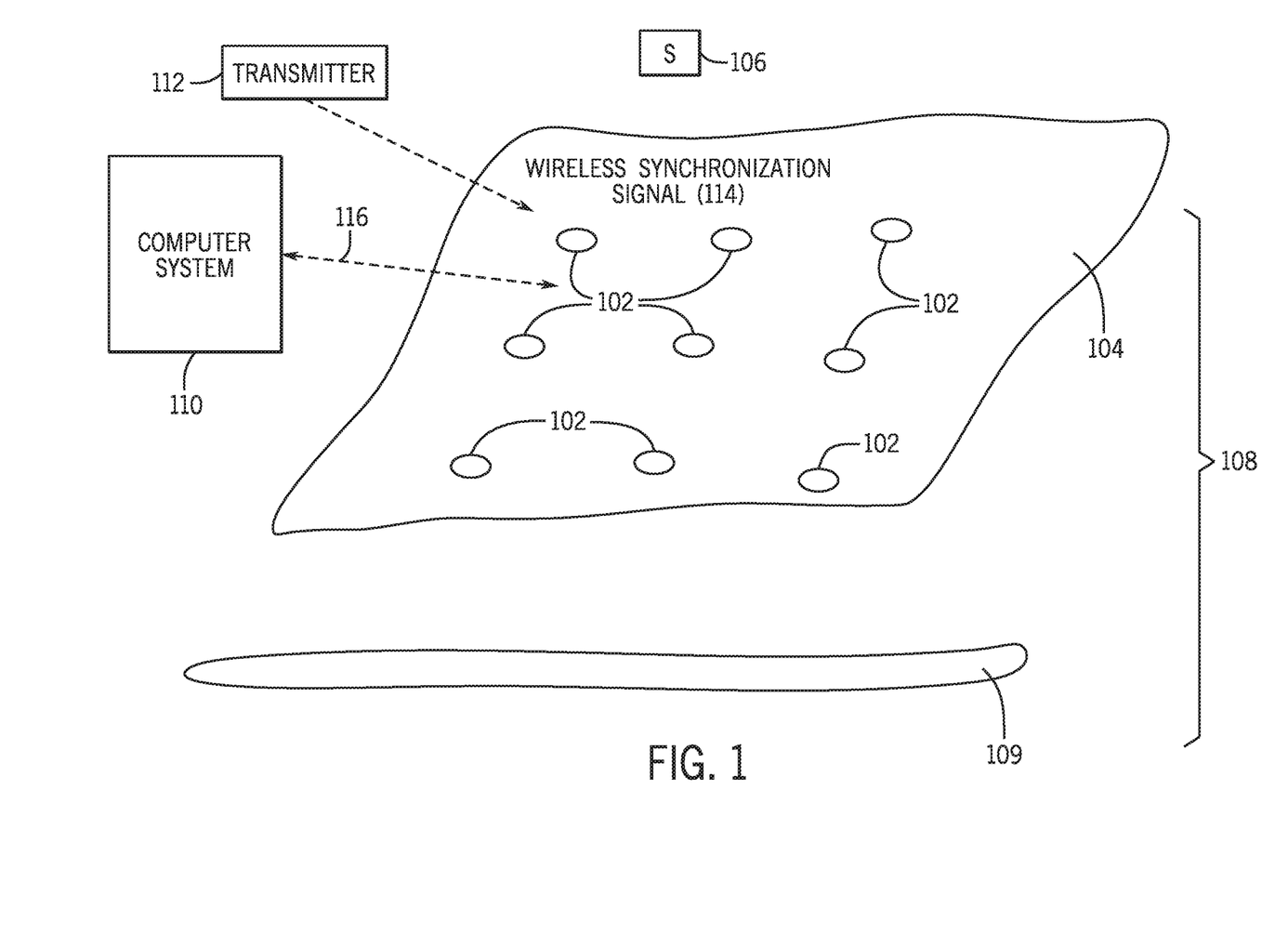
FIG. 1 is a block diagram of an example survey arrangement according to some implementations.

FIG. 1 is a block diagram of an example land-based survey data acquisition system that includes sensor nodes 102, a survey source (or multiple survey sources) 106, a computer system 110, and a transmitter 112. The sensor nodes 102 are placed on an earth or ground surface 104. The survey source(s) 106 can generate signals for propagation into a subterranean structure 108 underneath the earth surface 104. Signals that are affected or reflected from the subterranean structure 108 can be detected by sensors in the sensor nodes 102, which can output measured survey data for communication over a communications medium 116 between the sensor nodes 102 and the computer system 110.

The computer system 110 can be implemented with a computer or multiple computers. The communications medium 116 can include a wired link and/or a wireless link. Although not shown in FIG. 1, the survey data acquisition system 100 can include intermediate nodes, such as routers, base stations, and so forth, that can assist in communicating data between the sensor nodes 102 and the computer system 110.

In some examples, the survey data acquisition system can be a seismic data acquisition system, in which case the survey source 106 is a seismic source such as an air gun, a vibrator, an explosive device, or any other device that is able to generate a seismic signal for propagation into the subterranean structure 108. The sensor nodes 102 can include seismic sensors, such as particle motion sensors, hydrophones, and so forth.

In other examples, the survey data acquisition system is an EM data acquisition system, in which case the survey source 106 includes an EM source that can generate an EM signal for propagation into the subterranean structure 108. The transmitted EM signal is affected by the subterranean structure 108, and is detected by EM sensors in the sensor nodes 102.

Measured survey data transmitted by the sensor nodes 102 to the computer system 110 over the communications medium 116 can be processed to characterize the subterranean structure 108, such as for the purpose of identifying a subterranean element 109 of interest in the subterranean structure 108. The subterranean element 109 of interest can include a hydrocarbon bearing reservoir, a water aquifer, specific geological formation, or any other structure. The processing of the measured survey data can produce a representation of the subterranean structure 108, such as an image of the subterranean structure 108, a model of the subterranean structure 108, or any other representation that includes one or more parameters that characterize at least a portion of the subterranean structure 108.

The sensor nodes 102 are autonomous nodes that can perform operations autonomously (i.e., independently) of one another. The autonomous operations performed by the sensor nodes 102 can include sampling of survey data measured by sensors in the sensor nodes 102. In the survey data acquisition system, sampling operations between the sensor nodes may be synchronized by use of clocks in the respective sensor nodes 102.

However, as noted above, the clock in each sensor node 102 can deviate from a master or global clock over time. The master clock can be the clock in the computer system 110 or another central device that is used to control data transmissions over the communications medium 116. The deviation of the clocks in the sensor nodes 102 from the master clock can result from the frequency of a clock of a sensor node drifting from the frequency of the master clock, such that the sensor node clock and the master clock run at different frequencies. The deviation of the clocks in the sensor nodes 102 from the master clock can also result from a phase shift of a clock in the sensor node with respect to the master clock, such that the sensor node clock and the master clock are no longer in phase.

If the clock in a sensor node 102 starts to deviate from the frequency of the master clock, then sampled survey data that is transmitted by the sensor node 102 to the computer system 110 can become unsynchronized with respect to the master clock at the computer system 110. This can result in inaccuracies or errors when processing the sampled survey data at the computer system 110.

To allow the operations of the sensor nodes 102 to be synchronized with respect to the master clock, the survey data acquisition system includes a transmitter 112 that transmits a wireless synchronization signal 114 for receipt by the sensor nodes 102. The sensor nodes 102 can synchronize their operations with respect to the wireless synchronization signal 114. Although FIG. 1 shows just one transmitter 112, it is noted that in other examples, multiple transmitters 112 can transmit multiple wireless synchronization signals 114 to the sensor nodes 102. For example, the multiple transmitters 112 can be located at different locations with respect so that at least one transmitter 112 is within a line of sight of each sensor node 102.

In some examples, the transmitter 112 includes a light source that generates a light signal (which can have a wavelength in the visible spectrum or invisible spectrum) as the wireless synchronization signal 114. In other examples, the transmitter 112 includes an EM emitter to generate an EM signal as the wireless synchronization signal 114. For example, the EM emitter can be a radio frequency (RF) transmitter.

The transmitter 112 can be synchronized to a global positioning system (GPS) receiver, a precision global clock, or other time source so that the wireless synchronization signal 114 transmitted by the transmitter 112 is synchronized to the GPS receiver or another time source. The transmitter 112 can be controlled by the computer system 110 to transmit wireless synchronization signals 114. The transmitter 112 can be part of the computer system 110, or the transmitter 112 can be separate from the computer system 110 but communicatively coupled to the computer system 110 to receive control signals from the computer system 110.

Figure 2:
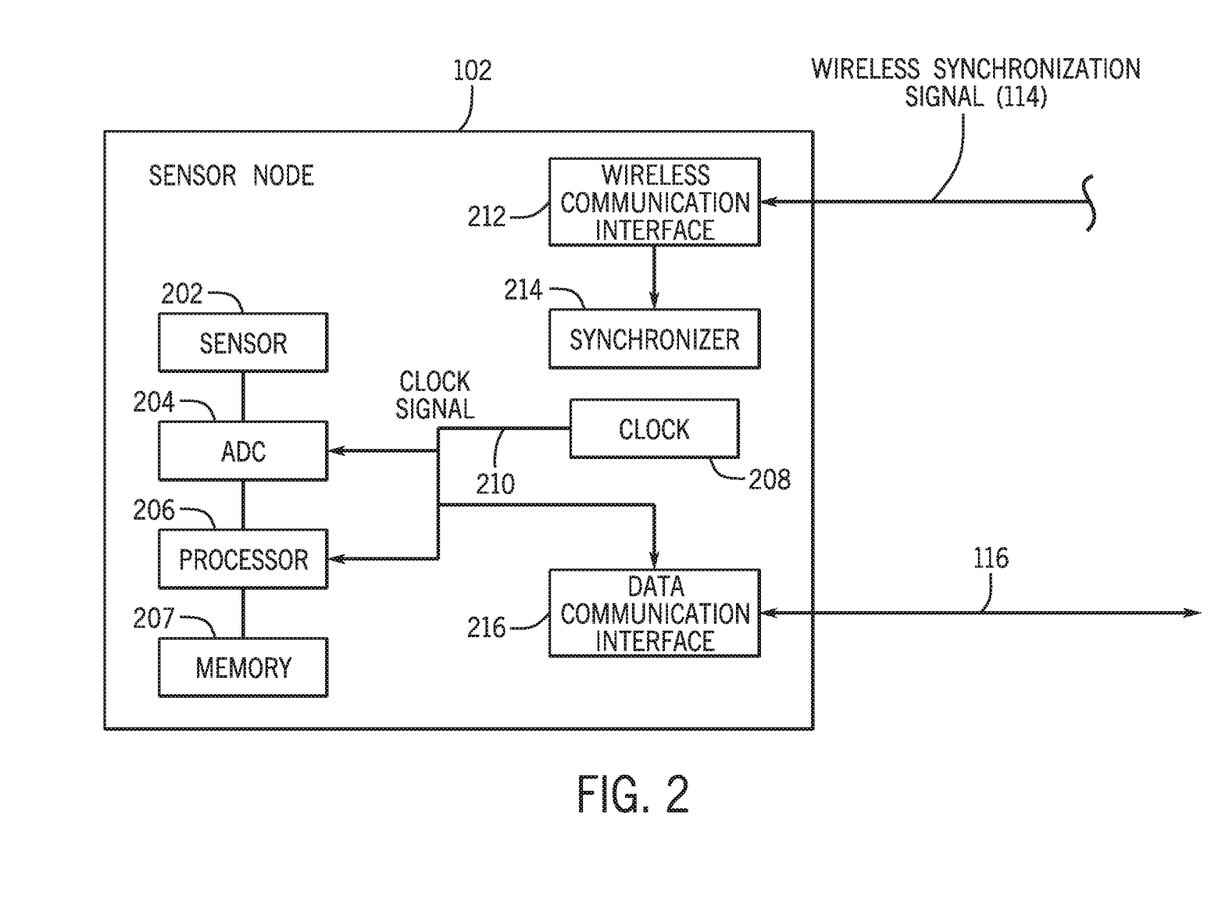
FIG. 2 is a block diagram of a sensor node according to some implementations.

FIG. 2 is a block diagram of an example sensor node 102 according to some implementations. A sensor node can refer to a physical device that includes various components, including a sensor 202 (or multiple sensors) and electronic components. Such electronic components can include, as examples, an analog-to-digital converter (ADC) 204 to convert between an analog signal output by the sensor 202 and a digital signal. The sensor 202 outputs the analog signal in response to detecting a survey signal affected or reflected from the subterranean structure 108.

The sensor node 102 can also include a processor 206 that is able to communicate with the ADC 204. The processor 206 can include a microprocessor, a core of a multi-core microprocessor, a digital signal processor, a microcontroller, a programmable gate array, a programmable integrated circuit device, or any other hardware processing circuit. In other examples, the processor 206 can be omitted.

The sensor node 102 further includes a data communication interface 216 (including a transceiver for example) that is used for communicating survey data to the computer system 110 over the communications medium 116. The data communication interface 216 can be a wired communication interface to communicate over a wired link, or a wireless communication interface to communicate over a wireless link.

The sensor node 102 also includes a clock 208 that is able to generate a clock signal 210. The clock signal 210 is provided to the ADC 204, the processor 206 and the data communication interface 216, which operate at a frequency according to the clock signal 210. The clock signal 210 is an oscillating signal that has a specified frequency.

In further examples, the clock signal 210 can be provided to further electronics components in the sensor node 102, such as a memory 207 in the sensor node 102.

In some examples, digitized survey data provided by the ADC 204 can be transmitted by the data communication interface 216 over the communications medium 116 to a remote device, such as the computer system 110 of FIG. 1. In further examples, the digitized survey data from the ADC 204 can be processed by the processor 206, such as to apply conditioning or filtering, before the survey data is transmitted by the data communication interface 216.

Over time, the clock signal 210 can deviate from a master clock signal, such as the clock signal used at the remote computer system 110 for data communications over the communications medium 116. To allow the sensor node 102 to re-synchronize its operation with the master clock signal, the sensor node 102 includes a wireless communication interface 212 to wirelessly receive the wireless synchronization signal 114 from the transmitter 112 of FIG. 1. In examples where the wireless synchronization signal 114 is a light signal, the wireless communication interface 212 includes a photosensitive detector (e.g., a photodiode) to detect the light signal, where the photosensitive detector is tuned to a target frequency of the light signal. In other examples where the wireless synchronization signal 114 is an EM signal such as an RF signal, the wireless communication interface 212 includes an EM receiver, which in some examples can include an antenna and an RF receiver tuned to the frequency of the carrier signal.

In accordance with some implementations of the present disclosure, the sensor node 102 includes a synchronizer 214 that is able to synchronize the operation of the sensor node 102 based on the received wireless synchronization signal 114. It is noted that although reference is made to "wireless synchronization signal" in the singular sense, it is noted that "wireless synchronization signal" implies one or more wireless synchronization signals. Thus, the synchronizer 214 can perform synchronization based on just one wireless synchronization signal, or based on multiple wireless synchronization signals.

The synchronizer 214 is able to detect a drift of the frequency of the clock signal 210 with respect to a target frequency, which can be the frequency of a master clock signal. The synchronizer 214 can be a hardware circuit, or in other examples, can include machine-readable instructions executable on the processor 206. Based on the detected drift, the synchronizer 214 can cause either (1) the frequency of the clock 208 (or oscillator) to be adjusted, or (2) apply an re-sampling interpolation technique, to synchronize the operation of the sensor node with the master clock.

Figure 3:
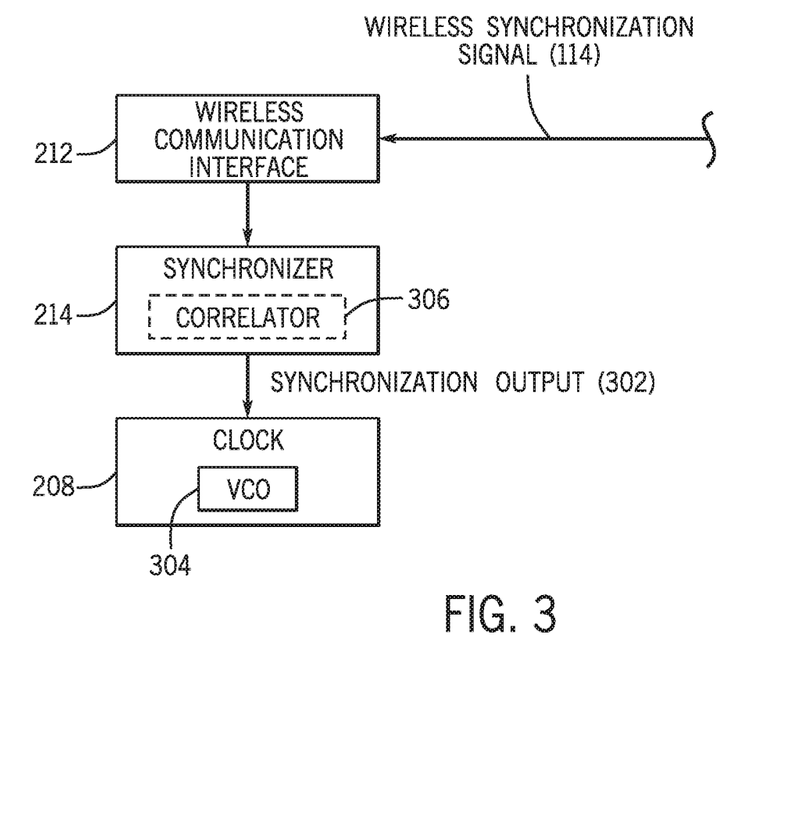
FIG. 3 is a block diagram of components of a sensor node to adjust a clock based on a wireless synchronization signal, in accordance with some implementations.

As shown in FIG. 3, to adjust the frequency of the clock 208 to match that of the master clock, the synchronizer 214 outputs a synchronization output 302 to the clock 208 to adjust the frequency of the clock 208. For example, the clock 208 can include a voltage-controlled oscillator (VCO) 304 whose frequency is controlled by an input voltage. In such examples, the synchronization output 302 is in the form of a voltage level that can be adjusted by the synchronizer 214 to control the frequency of the VCO 304. Based on the direction of drift of the frequency of the clock 208 (either the frequency has decreased or has increased with respect to the target frequency), the synchronizer 214 can decrease or increase the voltage level of the input voltage to the VCO 304.

Figure 4:
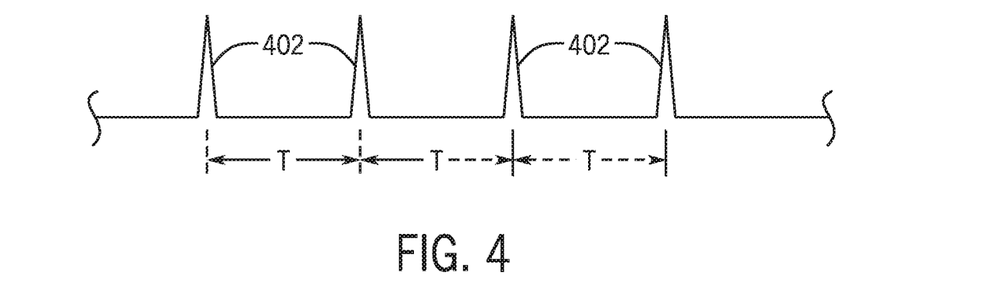
FIG. 4 is a timing diagram of a series of pulses that make up a wireless synchronization signal according to some implementations.

In some examples, as shown in FIG. 4, the wireless synchronization signal 114 can include a series of pulses 402. The series of pulses can include a series of light pulses or a series of EM pulses. In FIG. 4, a time interval T represents a clock period.

The synchronizer 214 can measure the time interval T between the pulses 402, and can then determine the target frequency (frequency of the master clock) based on the measured time interval T. The synchronizer 214 compares the target frequency to the frequency of the clock 208 to determine whether the frequency of the clock 208 has drifted from the target frequency. If so, the synchronizer 214 can adjust the synchronization output 302 to adjust the frequency of the clock 208.

In other examples, the wireless synchronization signal 114 is not in the form of a series of pulses. Instead, the wireless synchronization signal 114 can include just one pulse, or can include another signal that has a predefined content, such as a predefined sequence or code (where the code itself can be in the form of a series of pulses that have known periods). The pulse or another signal that has the predefined content can start and stop at time points known to the synchronizer 214. In some examples, if the wireless synchronization signal 114 is a light signal, the predefined sequence or code can include a specified code, a chirp, or a pseudorandom signal that is produced by performing modulation of the light signal using the content of the code, chirp, or pseudorandom signal. The modulation of the light signal can include amplitude modulation, phase modulation, or frequency modulation, as examples.

In further examples, if the wireless synchronization signal 114 is an EM signal, such as an RF signal, the predefined content can similarly include a specified code, a chirp, or a pseudorandom signal that is produced by performing modulation of a carrier signal using the content of the code, chirp, or pseudorandom signal In examples where the a specified code, a chirp, or a pseudorandom signal that is produced by performing modulation of the light signal using the content of the chirp or the pseudorandom signal includes just one pulse or a signal that has a predefined content, as shown the synchronizer 214 includes a correlator 306 (or a decoder), which can correlate or decode the received wireless synchronization signal 114 with a target signal (which has the predefined sequence or code). The correlation/decoding performed by the correlator/decoder 306 produces a respective pulse. The correlation performed by the correlator 306 on multiple successive wireless synchronization signals 114 received by the sensor node 102 produces a series of pulses similar to the pulses 402 shown in FIG. 4, with a target time interval T between successive pulses. The series of pulses produced by the correlator/decoder 306 can then be used by the synchronizer 214 to synchronize the clock 208. More generally, the correlator/decoder 306 can be referred to as a signal processor that processes the received wireless synchronization signal based on the target signal.

In further examples, a set of wireless synchronization signals can be transmitted, where the wireless synchronization signals of the set have reduced (e.g., minimum) correlations with respect to each other. For example, the wireless synchronization signals of the set can include orthogonal pseudorandom signals. The use of wireless synchronization signals with reduced correlations with respect to each other can be used as part of more complex synchronization techniques.

The foregoing refers to techniques to synchronize the clock 208 of the sensor node 102 based on the received wireless synchronization signal 114. In further implementations, as noted above, a re-sampling interpolation technique can be applied to synchronize the operation of the sensor node with the master clock.

Figure 5:
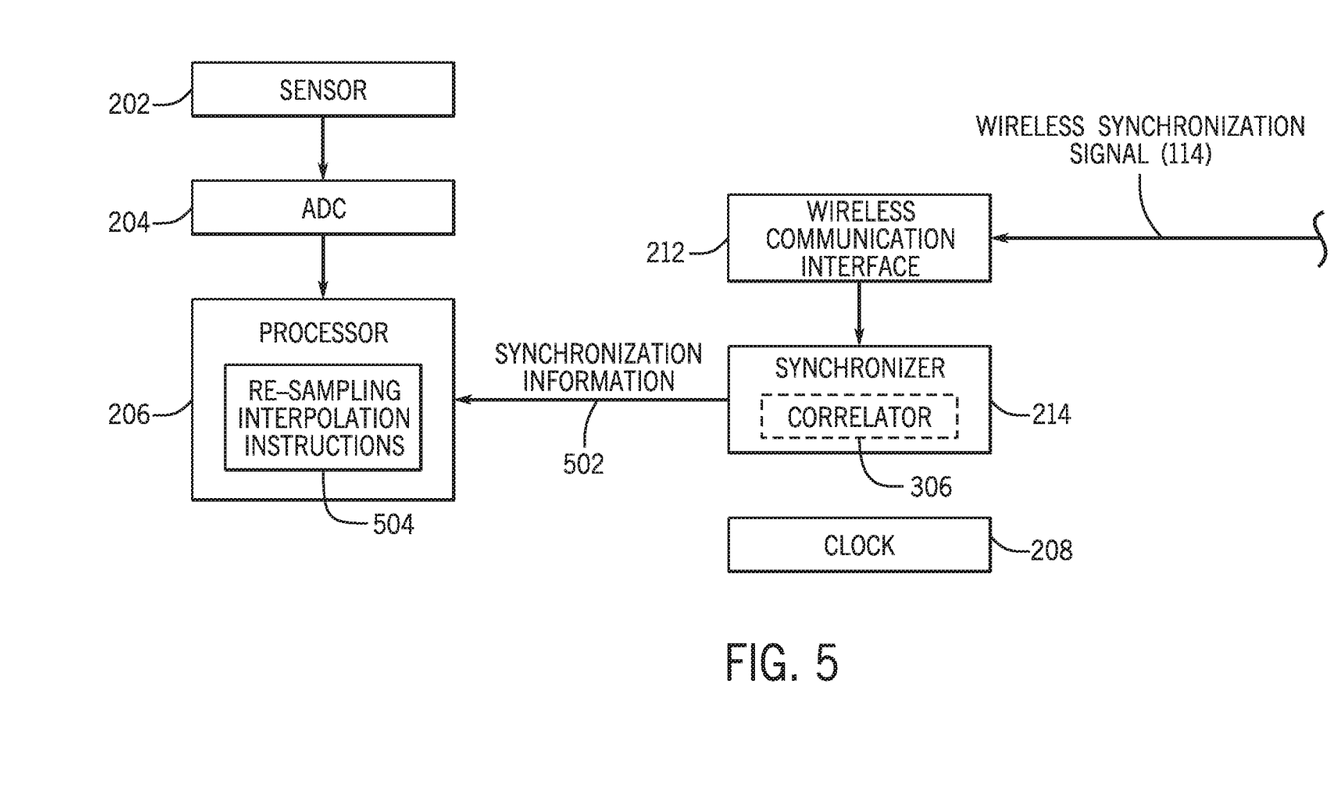
FIG. 5 is a block diagram of components of a sensor node to re-sample, using interpolation data, of survey data measured by the sensor node in response to a clock drift determined based on a wireless synchronization signal, in accordance with some implementations.

FIG. 5 shows an example arrangement in a sensor node 102 to perform the re-sampling interpolation technique according to some examples. The arrangement includes the synchronizer 214 and possibly the correlator/decoder 306 as described above, which is able to determine a drift of the frequency of the clock 208 of the sensor node 102 with respect to a target frequency.

The synchronizer 214 sends synchronization information 502 to the processor 206, where the synchronization information 502 can include a target frequency (of the master clock) and a drift of the sensor node's clock 208, for example. The processor 206 executes re-sampling interpolation instructions 504 to perform the re-sampling interpolation technique.

The re-sampling interpolation instructions 504 can up-sample survey data acquired by the sensor 202 and digitized by the ADC 204 to a particular fixed sampling rate relative to a high precision clock, i.e., a clock running at the target frequency of the master clock as determined from the wireless synchronization signal 114. The up-sampling of the survey data using a linear or nonlinear interpolation of the survey data based on the drift determined by the synchronizer 214, to increase the effective sampling rate. The survey data can then be decimated (down-sampled to a fixed sampling frequency) relative to the high precision clock. The period between intermittent adjustments of the sampling frequency to the high frequency clock may be determined based on the nominal drift of the sensor node clock 208, for example 50 parts per million (ppm) or some other value, and the level of noise allowed in the system.

Decimation is the process of filtering and downsampling a signal to decrease its effective sampling rate. The filtering is employed to prevent aliasing that might otherwise result from down-sampling. The operation of down-sampling by factor $M \in N$ (where N is a specified integer) describes the process of keeping each M-th sample and discarding the rest.

Interpolation is the process of up-sampling and filtering a signal to increase its effective sampling rate. The operation of up-sampling by factor $L \in N$ describes the insertion of L−1 zeros between each sample of the input signal. The up-sampling factor used in interpolation, linear or nonlinear, is largely determined by the level of noise allowed at the output.

The processor 206 at one stage may use a sampling frequency of X+δ Hertz (Hz), where X is the nominal sampling frequency and "δ" is the deviation of the sensor node clock 208 from the high precision clock. In certain examples, δ is calculated and provided periodically or intermittently to the processor 206 by the synchronizer 214. The sampling frequency, X, is then interpolated to P·X, where P is an integer. In a specific example, at one particular decimation stage, it can be assumed that the sampling frequency is 20 kiloHertz (kHz)+δ relative to the master clock's sampling frequency. The value of the drift δ is small relative to 20 kHz. In this specific example, a linear interpolation of approximately 16 times (i.e. P≈16 is applied to produce a signal of 320 kHz). The signal is then downsampled, this time by 16 times, back to 20 kHz by a down-sampling filter and prior to further filtering and down-sampling at later decimation stages.

Interpolation techniques may include any method of constructing new data points from a discrete set of data points. There are many different interpolation methods, such as linear, polynomial, spline, and the like. Some of the concerns to take into account when choosing an appropriate interpolation algorithm include the accuracy of the technique, the cost of the technique, the smoothness of the interpolant, and/or a number of data points used. Linear interpolation is generally easier to implement than other interpolation techniques, but may not have the desired accuracy. Error is proportional to the square of the distance between the data points. Another issue with linear interpolation is that the interpolant is not differentiable at the point of interest. Polynomial interpolation is a generalization of linear interpolation. In linear interpolation, the interpolant is a linear function. In polynomial interpolation, the linear interpolant is replaced by a polynomial of higher degree. The interpolation error is proportional to the distance between the data points to the power n, where n is the number of data points. Furthermore, the interpolant is a polynomial and thus infinitely differentiable. However, calculating the interpolating polynomial may be relatively computationally expensive. Furthermore, polynomial interpolation may not be precise at the end points.

In other examples, spline interpolation can be used, where spline interpolation employs low-degree polynomials in each of the intervals, and chooses the polynomial pieces such that they fit smoothly together. The resulting function is called a spline. Other forms of interpolation may be used by picking a different class of interpolants. Some examples include rational interpolation, which is interpolation by rational functions, and trigonometric interpolation, which is interpolation by trigonometric polynomials. The discrete Fourier transform is a special case of trigonometric interpolation. Another possibility is to use wavelets. Multivariate interpolation is the interpolation of functions of more than one variable, and such methods include bilateral interpolation and bi-cubic interpolation in two dimensions, and trilateral interpolation in three dimensions.

Figure 6A:
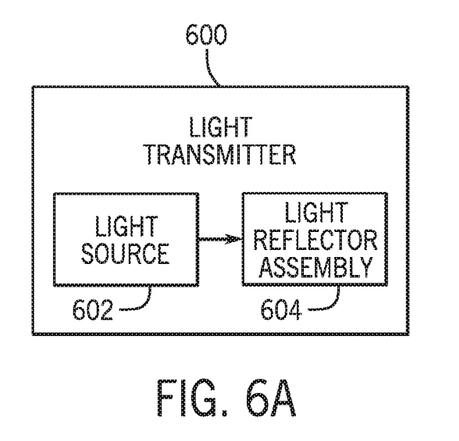
FIGS. 6A-6B illustrate example transmitters of wireless synchronization signals, according to various implementations.

FIG. 6A illustrates an example where the transmitter 112 of FIG. 1 is a light transmitter 600, which includes a light source 602 and a light reflector assembly 604 that includes reflectors (e.g., mirrors) to direct light from the light source

602 along a target direction (which is generally in the direction of at least a subset of the sensor nodes 102 of FIG. 1).

Figure 6B:
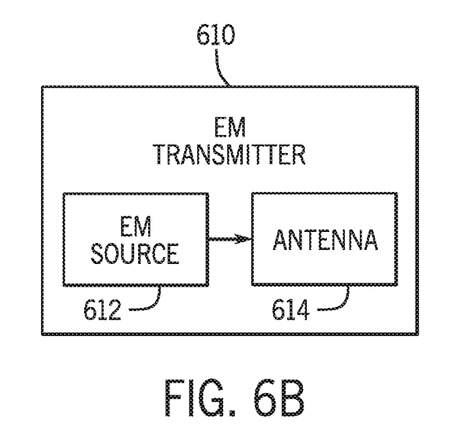

FIG. 6B illustrates an example where the transmitter 112 of FIG. 1 is an EM transmitter 610, which includes an EM source 612 that generates an EM signal, and an antenna 614 to propagate the EM signal.

Figure 7:
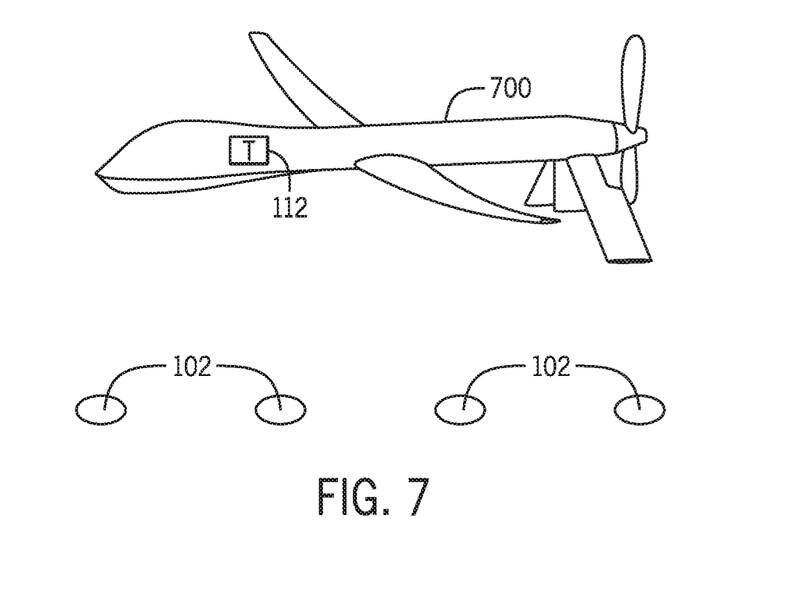
FIG. 7 illustrates an airborne vehicle to carry a transmitter of a wireless synchronization signal, according to further implementations.

In some examples, as shown in FIG. 7, the transmitter 112 can be carried by an airborne vehicle 700, such as a drone (un-manned and remotely operated), a balloon, or an airplane (which can be flown by a human pilot).

In some examples, some components, such as the synchronizer 214 (FIG. 2) and the re-sampling interpolation instructions 504 (FIG. 5) can be implemented as machine-readable instructions that are executable on a processor. As used here, machine-readable instructions executable on a processor to perform a task can refer to the machine-readable instructions executable on one processor to perform the task, or executable on multiple processors to perform the task.

The machine-readable instructions can be stored on a non-transitory machine-readable or computer-readable readable storage medium. The storage medium can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   receiving, by a sensor node comprising a sensor to measure survey data of a target structure, a wireless synchronization signal, wherein the wireless synchronization signal is received from a transmitter located on an airborne vehicle;
   synchronizing, by the sensor node, an operation of the sensor node based on the wireless synchronization signal;
   determining, based on the wireless synchronization signal, an amount of drift of a clock or oscillator of the sensor node; and
   synchronizing the clock or oscillator, based on the determined amount of drift, by adjusting a frequency of the clock or oscillator, and
   re-sampling using interpolation, the measured survey data, wherein re-sampling using interpolation, includes:
      up-sampling the measured survey data to a fixed sampling rate determined from the wireless synchronization signal;
      increasing an effective sample rate of the measured survey data; and
      decimating the measured survey data to the fixed sampling rate as determined from the wireless synchronization signal.

2. The method of claim 1, wherein receiving the wireless synchronization signal comprises receiving a light signal.

3. The method of claim 2, wherein receiving the light signal comprises receiving one or more selected from among a light pulse, a series of light pulses, and a light signal modulated with a predefined content.

4. The method of claim 1, wherein receiving the wireless synchronization signal comprises receiving an electromagnetic signal.

5. The method of claim 4, wherein receiving the electromagnetic signal comprises receiving one or more selected from among an EM pulse, a series of EM pulses, and a carrier signal at a specified frequency modulated with a predefined content.

6. The method of claim 1, wherein the synchronizing comprises:
   processing, using a signal processor in the sensor node, the wireless synchronization signal based on a target signal, the processing comprising correlating or decoding the wireless synchronization signal.

7. The method of claim 6, wherein the processing produces a synchronization pulse that is used to synchronize the operation of the sensor module.

8. The method of claim 1, wherein receiving the wireless synchronization signal comprises receiving synchronization pulses with a predefined interval between successive synchronization pulses.

9. The method of claim 1, wherein the wireless synchronization signal is received as part of a set of wireless synchronization signals with reduced correlations with respect to each other, and wherein the synchronizing is based on the set of wireless synchronization signals.

10. The method of claim 1, wherein the adjusting the frequency of the clock includes adjusting a voltage to the clock.

11. The method of claim 1, wherein the transmitter is synchronized to a global positioning system (GPS) receiver or a precision global clock.

12. The method of claim 1, wherein the interpolating to increase an effective sample rate of the measured survey data utilizes an interpolation method for the measured survey data, wherein the interpolation method includes at least one of linear interpolation or non-linear interpolation.

13. The method of claim 12, wherein the non-linear interpolation of the survey data includes a polynomial interpolation method.

14. The method of claim 12, wherein the non-linear interpolation of the survey data includes a spline interpolation method.

15. The method of claim 12, further including:
   determining the interpolation method by evaluating at least one of
      an accuracy of the interpolation method, a cost of the interpolation method,
a smoothness of an interpolant, and
a number of data points used for the interpolation method.

16. A non-transitory machine-readable storage medium storing instructions that upon execution cause a sensor node to:
receive a wireless synchronization signal;
synchronize a sampling of survey data measured by a sensor of the sensor node based on the wireless synchronization signal;
determine, based on the wireless synchronization signal, an amount of drift of a clock or oscillator of the sensor node; and
synchronize the clock or oscillator, based on the determined amount of drift, by adjusting a frequency of the clock or oscillator, and
re-sampling using interpolation, the measured survey data, wherein re-sampling using interpolation, includes:
up-sampling the measured survey data to a fixed sampling rate determined from the wireless synchronization signal;
increasing an effective sample rate of the measured survey data; and
decimating the measured survey data to the fixed sampling rate as determined from the wireless synchronization signal.

17. The non-transitory machine-readable storage medium of claim 16, wherein the wireless synchronization signal is received from a transmitter located on an airborne vehicle.

* * * * *